(12) United States Patent
Fort et al.

(10) Patent No.: US 7,446,596 B1
(45) Date of Patent: Nov. 4, 2008

(54) LOW VOLTAGE CHARGE PUMP

(75) Inventors: Jimmy Fort, Aix En Provence (FR); Fabrice Siracusa, Aix En Provence (FR)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 11/753,932

(22) Filed: May 25, 2007

(51) Int. Cl.
*G05F 1/10* (2006.01)
(52) U.S. Cl. .................................... 327/536
(58) Field of Classification Search ................. 327/535, 327/536, 537
See application file for complete search history.

(56) References Cited

U.S. PATENT DOCUMENTS

| | | | |
|---|---|---|---|
| 6,307,425 B1 * | 10/2001 | Chevallier et al. ........... | 327/536 |
| 6,492,861 B2 * | 12/2002 | Rey et al. .................... | 327/536 |
| 7,030,683 B2 * | 4/2006 | Pan et al. ..................... | 327/536 |
| 7,046,076 B2 | 5/2006 | Daga et al. | |
| 7,365,591 B2 * | 4/2008 | Tobita ......................... | 327/536 |
| 7,382,177 B2 * | 6/2008 | Cordoba et al. ............. | 327/536 |

* cited by examiner

*Primary Examiner*—Jeffrey S Zweizig
(74) *Attorney, Agent, or Firm*—Schwegman, Lundberg & Woessner, P.A.

(57) ABSTRACT

A single pump stage of a multi-stage charge pump couples a first low-voltage NMOS transistor in series with a first low-voltage PMOS transistor between charge transfer capacitors. A second low-voltage NMOS transistor is coupled between the gate and the source of the first NMOS transistor. A second low-voltage PMOS transistor is coupled between the gate and the source of the first PMOS transistor. Respective boost voltages are applied to gates of the first NMOS transistor and the second PMOS transistor to minimize threshold voltage losses. A stabilizing capacitor is connected between the first NMOS transistor and the second PMOS transistor.

14 Claims, 4 Drawing Sheets

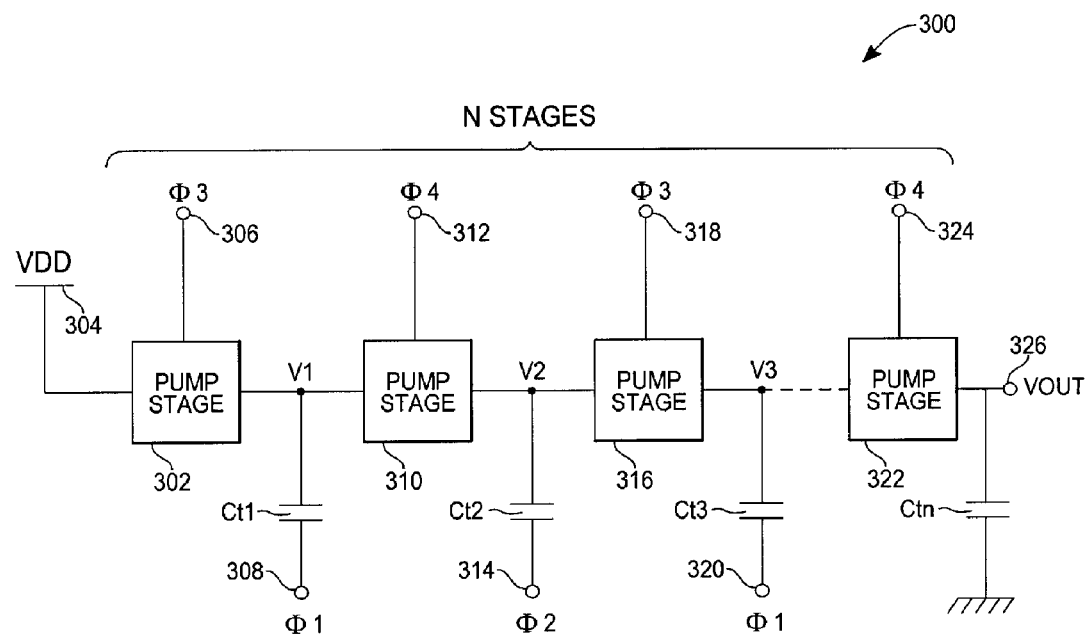
Fig._3
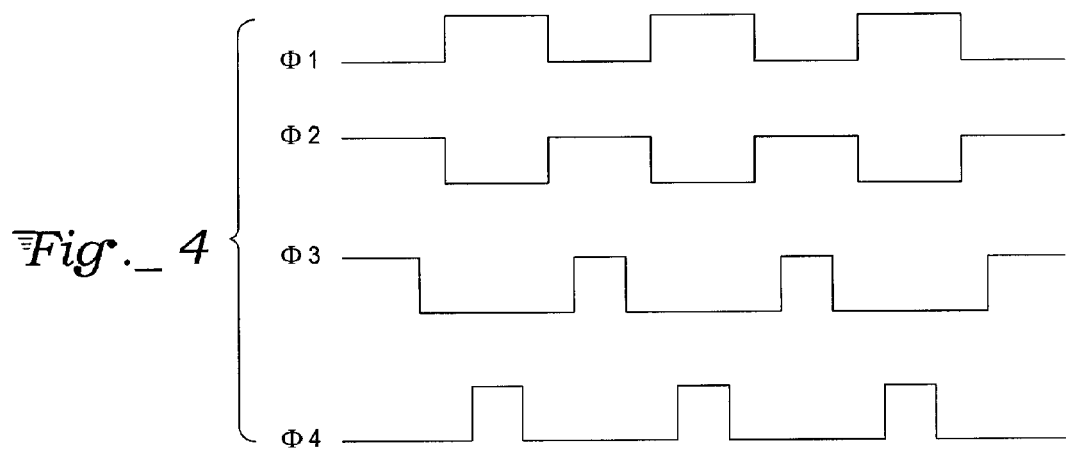
Fig._4

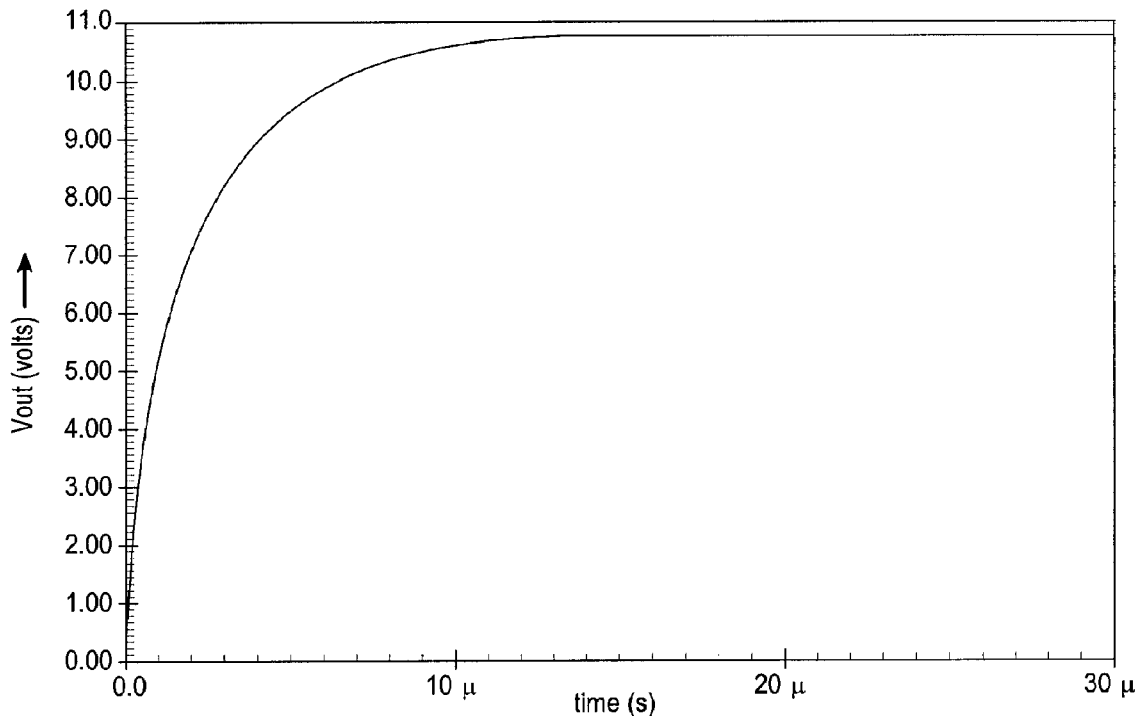
Fig._5
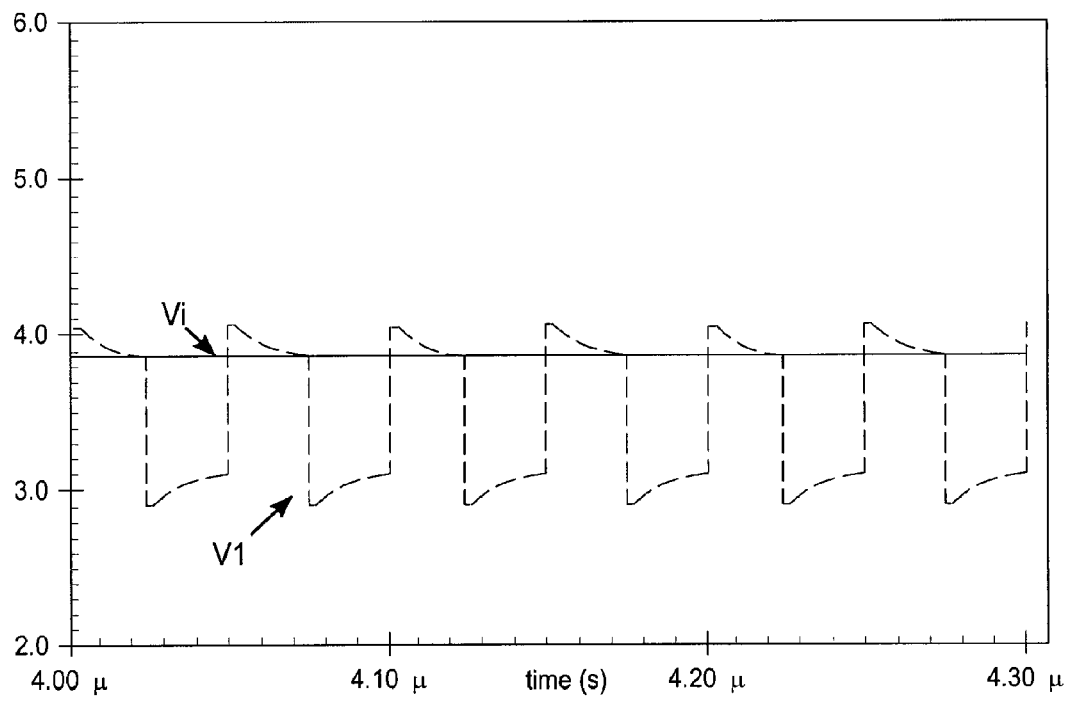
Fig._6

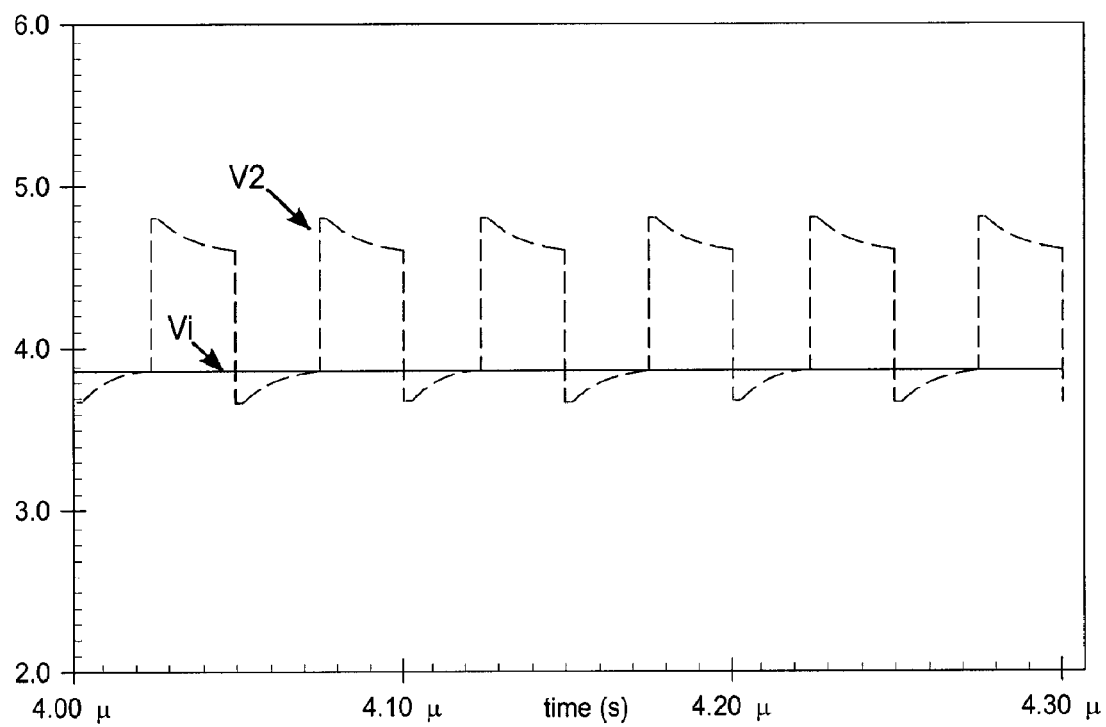
Fig. _ 7

US 7,446,596 B1

LOW VOLTAGE CHARGE PUMP

TECHNICAL FIELD

The present invention relates to charge pump circuits.

BACKGROUND ART

Charge pump circuits are frequently used in a semiconductor integrated circuit to provide an internal voltage that is higher than an external voltage provided to the semiconductor integrated circuit from an external power supply, such as a battery. Charge pump circuits are also used to provide a voltage of reverse polarity. Charge pump circuits are particularly useful in FLASH and EEPROM non-volatile memories, but are gaining more and more acceptance in analog circuits in order to increase dynamic range and to simplify circuit design.

FIG. 1 illustrates a conventional Dickson charge pump 10 which uses multiple stages of switched-capacitor circuits. Each of the stages includes a capacitor and a diode-connected NMOS transistor. A first Dickson charge pump stage includes an NMOS transistor ND1 and a capacitor C1. A second Dickson charge pump stage includes an NMOS transistor ND2 and a capacitor C2. A third Dickson charge pump stage includes an NMOS transistor ND3 and a capacitor C3. A fourth Dickson charge pump stage includes an NMOS transistor ND4 and a capacitor C4. A fifth Dickson charge pump stage includes an NMOS transistor ND5 and a capacitor C5. The NMOS transistors ND1, ND2, ND3, ND4, ND5 each have their bulk or substrate connected to ground, their drain and gate connected together to a stage capacitor, and their source connected to the capacitor of the next stage. Two oppositely phased clock signals, ΦA and ΦB are used for pumping charge from stage to stage. The maximum gain per stage of the Dickson charge pump 10 is (VDD-VT), where VT is the threshold voltage of an NMOS device. For n stages, the gain of a conventional Dickson charge pump is n(VDD-VT). The gain is thus reduced by n times the VT threshold voltage.

For some applications, the conventional Dickson charge pump 10 has a number of drawbacks. For instance, the number of stages that can be cascaded is limited by the amount of the voltage drop increase between the source and the bulk of an NMOS device resulting in a dramatic VT increase on the last stages. Another significant drawback is that high voltage transistors with thick oxide layers are necessary to sustain a large voltage drop between gate and bulk in a reliable way. This makes it difficult to design conventional Dickson charge pumps using thin oxide, low voltage standard devices which can sustain a maximum drop of only VDD.

SUMMARY OF THE INVENTION

One embodiment of a charge pump stage includes a NMOS section and a PMOS section. The NMOS section includes: a first NMOS transistor coupled between an input node and an intermediate node; a second NMOS transistor coupled between a gate of the first NMOS transistor and the input node and with a gate coupled to the intermediate node for refreshing a voltage at the gate of the first NMOS transistor. A first transfer capacitor is coupled between the input node and a first clock input terminal and is configured to receive a first clock input signal. A first coupling capacitor is coupled between the gate of the first NMOS transistor and a boost clock signal terminal that is configured to receive a boost clock signal. The PMOS section includes: a first PMOS transistor coupled between the intermediate node and an output node, a second PMOS transistor coupled between a gate of the first PMOS transistor and the output node with a gate coupled to the intermediate node for refreshing a voltage at the PMOS first gate of the first PMOS transistor. A second transfer capacitor is coupled between the output node and a second inverted clock input terminal and configured to receive an inverted first clock signal. A second coupling capacitor is coupled between the gate of the first PMOS transistor and an inverted boost clock signal terminal that is configured to receive an inverted boost clock signal. A stabilizing capacitor is coupled between the intermediate node and a ground voltage reference terminal.

Another embodiment of a charge pump stage includes a NMOS section that includes: a first NMOS transistor coupled between an input node and an intermediate node, a second NMOS transistor that is coupled between a gate of the first NMOS transistor and the input node and that has a gate coupled to the intermediate node for refreshing a voltage at the first NMOS gate of the first NMOS transistor. A first transfer capacitor is coupled between the input node and a first clock input terminal and is configured to receive a first clock input signal. A first coupling capacitor is coupled between the gate of the first NMOS transistor and a boost clock signal terminal that is configured to receive a boost clock signal while the first clock input signal is active. A PMOS section includes: a first PMOS transistor that is coupled between the intermediate node and an output node, a second PMOS transistor that is coupled between a gate of the first PMOS transistor and the output node and that has a gate coupled to the intermediate node for refreshing a voltage at the first PMOS gate of the first PMOS transistor. A second transfer capacitor is coupled between the output node and a second clock input terminal that is configured to receive a second clock input signal. A second coupling capacitor is coupled between the gate of the first PMOS transistor and an inverted boost clock signal terminal that is configured to receive an inverted boost clock signal while the second clock signal is active. The maximum voltage across the first NMOS transistor, the second NMOS transistor, the first PMOS transistor, and the second PMOS transistor is the VDD supply voltage. A stabilizing capacitor is coupled between the intermediate node and a ground voltage reference terminal.

A multi-stage embodiment of a charge pump includes a plurality of charge pump stages connected in series, each charge pump stage includes a NMOS section and an NMOS section. The NMOS section includes: a first NMOS transistor that is coupled between an input node and an intermediate node, a second NMOS transistor that is coupled between a gate of the first NMOS transistor and the input node and that has a gate coupled to the intermediate node for refreshing the voltage at the first NMOS gate of the first NMOS transistor. A first transfer capacitor is coupled between the input node and a first clock input terminal and is configured to receive a first clock input signal. A first coupling capacitor is coupled between the gate of the first NMOS transistor and a boost clock input terminal that is configured to receive a boost clock signal. The PMOS section includes: a first PMOS transistor that is coupled between the intermediate node and an output node, a second PMOS transistor that is coupled between a gate of the first PMOS transistor and the output node and that has a gate coupled to the intermediate node for refreshing the voltage at the first PMOS gate of the first PMOS transistor. A second transfer capacitor is coupled between the output node and a second inverted clock input terminal and is configured to receive an inverted first clock signal. A second coupling capacitor is coupled between the gate of the first PMOS transistor and an inverted boost clock input terminal and is configured to receive an inverted boost clock signal. The first and the second clock input signals have opposite phases and operate between VDD and 0 volts. The maximum voltage across the first NMOS transistor, the second NMOS transistor, the first PMOS transistor, and the second PMOS transistor is VDD.

BRIEF DESCRIPTION OF DRAWINGS

FIG. 3 is a block diagram of a multi-stage charge pump.

FIG. 4 is a timing chart for the multi-stage charge pump of FIG. 3.

FIG. 5 illustrates Vout as a function of time for a multi-stage charge pump.

FIG. 6 illustrates input and intermediate voltages as functions of time for one stage of a multi-stage charge pump.

FIG. 7 illustrates intermediate and output voltages as functions of time for one stage of a multi-stage charge pump.

DETAILED DESCRIPTION

Figure 1:
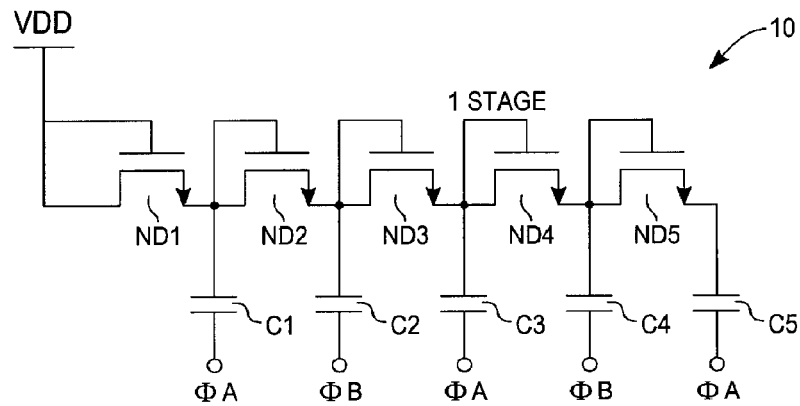
FIG. 1 is a simplified circuit diagram of a prior art Dickson charge pump circuit.
Figure 2:
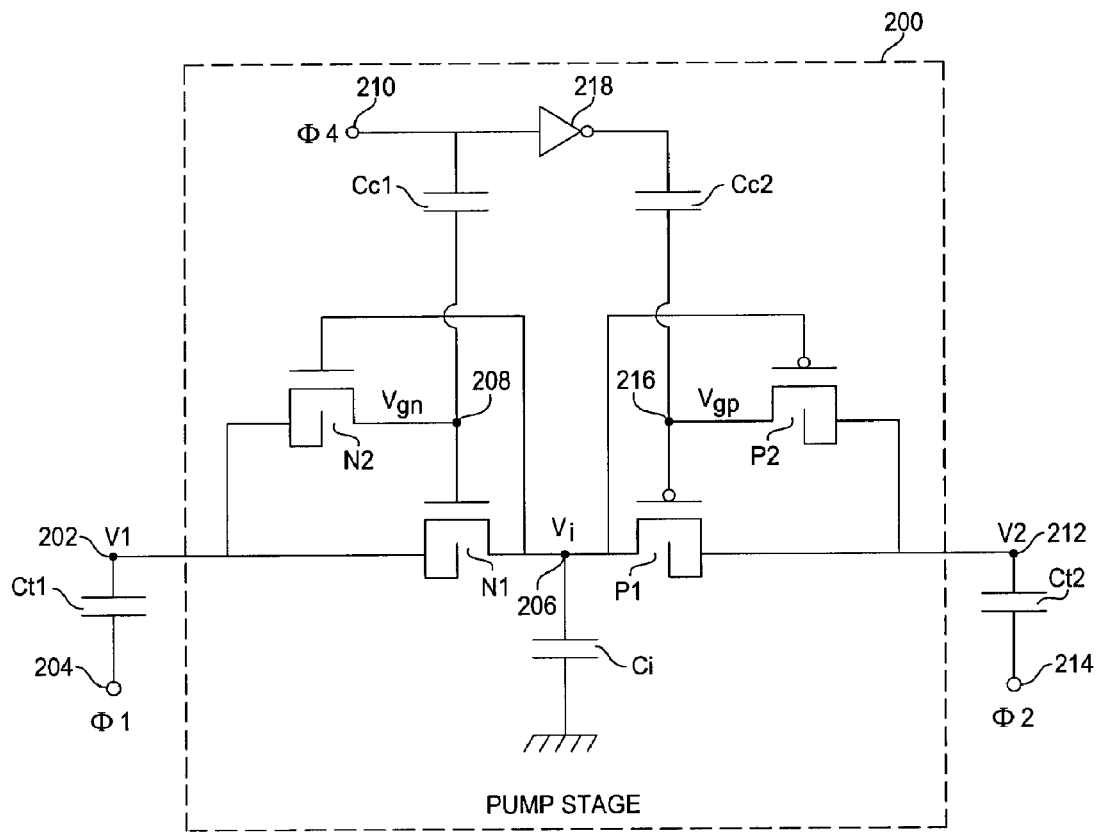
FIG. 2 is a circuit diagram of a single stage charge pump.

FIG. 2 illustrates an embodiment of a single pump stage 200 of a multi-stage charge pump. The pump stage 200 has an input node 202 to which is coupled one terminal of a first transfer capacitor Ct1. A second terminal of the first transfer capacitor Ct1 is coupled to a first clock input terminal 204 which is configured to receive a Φ1 clock input signal. An input voltage signal V1 is provided at the input terminal 202. A first NMOS transistor N1 has a source terminal and a bulk terminal coupled to the input node 202 and a drain terminal coupled to an internal node 206. A voltage signal at the internal node 206 is designated V1. An internal stabilizing capacitor C1 has one terminal coupled to the internal node 206 and another terminal coupled to a ground terminal. A second NMOS transistor N2 has a source and bulk terminal coupled to the input node 202 and a drain terminal coupled to a first NMOS gate node 208 to which is coupled a gate of the first NMOS transistor N1. A voltage signal at the first NMOS gate node 208 is designated Vgn. A gate terminal of the second NMOS transistor N2 is coupled to the internal node 206. A first coupling capacitor Cc1 has a first terminal coupled to a gate node 208 of the first NMOS and a second terminal coupled to a clock input terminal 210 which is configured to receive a Φ4 clock input signal.

The pump stage 200 has an output node 212 to which is coupled one terminal of a second transfer capacitor Ct2. A second terminal of the second transfer capacitor Ct2 is coupled to a second clock input terminal 214 at which is provided a Φ2 clock input signal. An output voltage signal V2 is provided at the output node 212. A first PMOS transistor P1 has one terminal coupled to the output node 212 and another terminal coupled to the internal node 206. A second PMOS transistor P2 has one terminal coupled to the output node 212 and another terminal coupled to a first PMOS gate node 216 to which is coupled a gate of the first PMOS transistor P1. A voltage signal at the first PMOS gate node 214 is designated Vgp. A gate terminal of the second PMOS transistor P2 is coupled to the internal node 206. A second coupling capacitor Cc2 is coupled between the first PMOS gate node 216 and an output terminal of an inverter 218 at which is provided an inverted 44 boost clock input signal. An input terminal of the inverter 218 is coupled to the first clock input terminal 210 at which is provided the φ4 boost clock input signal.

The maximum voltage drop across each of the two thin-oxide NMOS transistors N1, N2 and the two thin-oxide PMOS transistors P1, P2 is VDD. The transfer capacitors Ct1 and Ct2 are used to transfer charge. The coupling capacitor Cc1 and the coupling capacitor Cc2 provide respective boost voltages on the gates of the first NMOS transistor N1 and the first PMOS transistor P1 such that first NMOS transistor N1 and the first PMOS transistor P1 have minimal voltage transfer loss, or no voltage degradation. The internal stabilizing capacitor C1 stabilizes the internal node 206 at an intermediate voltage level in order to avoid having a voltage drop higher than VDD across the transistors.

FIG. 3 illustrates a multi-stage charge pump 300 that includes N stages, each of which is similar to the pump stage 200 of FIG. 2. FIG. 4 illustrates clock signal waveforms for clock signals used with the multi-stage charge pump of FIG. 3.

Referring to FIG. 3, a first charge pump stage 302 has an input terminal that is configured to be coupled to a VDD voltage terminal 304. A first clock input terminal 306 of the first charge pump stage 302 is configured to receive to a φ3 clock input signal. An output terminal of the first charge pump stage 302 is configured to provide an output signal V1. The output terminal of the first charge pump stage 302 is coupled to one terminal of a first transfer capacitor Ct1, the other terminal of which is coupled to a second clock terminal 308 that is configured to receive a Φ1 clock input signal.

A second charge pump stage 310 has an input terminal that is configured to be coupled to the output terminal of the first charge pump stage 302. A third clock input terminal 312 of the second charge pump stage 310 is configured to receive a Φ4 clock input signal. An output terminal of the second charge pump stage 310 is configured to provide an output signal V2. The output terminal of the second charge pump stage 310 is coupled to one terminal of a second transfer capacitor Ct2, the other terminal of which is coupled to a fourth clock terminal 314 that is configured to receive a Φ2 clock input signal.

A third charge pump stage 316 has an input terminal that is configured to be coupled to the output terminal of the second charge pump stage 310. A fifth clock input terminal 318 of the third charge pump stage 316 is configured to receive the Φ3 clock input signal. An output terminal of the third charge pump stage 316 is configured to provide an output signal V3. The output terminal of the third charge pump stage 316 is coupled to one terminal of a third transfer capacitor Ct3, the other terminal of which is coupled to a fifth clock terminal 320 that is configured to receive the Φ1 clock input signal.

The number of charge pump stages continues as described in connection with the second charge pump stage 310 and the third charge pump stage 316 until an nth charge pump stage 322, where n ranges from 2 to a number selected by a user for a desired application. The nth charge pump stage 322 has an input terminal that is coupled to output terminal of a previous charge pump stage. An nth clock input terminal 324 of the nth charge pump stage 322 is configured to receive the Φ4 clock input signal. An output terminal of the nth charge pump stage 322 is configured to provide an output signal VOUT for the multi-stage charge pump 300. The output signal Vout for the multi-stage charge pump 300 is coupled to an output terminal 326 of the nth charge pump stage 322. An output terminal of the nth charge pump stage 322 is coupled to one terminal of an nth transfer capacitor Ctn, the other terminal of which is coupled to a ground terminal.

FIG. 4 illustrates clock signal waveforms for the clock signals Φ1, Φ2, Φ3, Φ4 of the multi-stage charge pump 300 of FIG. 3. The clock signals Φ1, Φ2, Φ3, Φ4 range between a high level of VDD volts and a low level of 0 volts, where VDD is, for example, one volt. FIG. 4 illustrates and embodiment of the clock signals Φ1, Φ2 as oppositely phased square wave signals. Clock signal Φ3 is set to a high level after clock signal Φ2 goes to a high level. Clock signal Φ3 goes to a low level before clock signal Φ2 goes to a low level. Clock signal Φ4 is set to a high level after clock signal Φ1 goes to a high level. Clock signal Φ4 goes to a low level before clock signal Φ1 goes to a low level.

At the beginning of operation, all nodes of the pump stages of multi-stage charge pump 300 of FIG. 3 are initially set to VDD volts. The design of the pump stages, typically illustrated in FIG. 2, permits VDD to be at a predetermined level, such as, for example, one volt, without a loss of charge pumping efficiency.

With reference to FIGS. 2, 3, and 4, when the Φ1 clock signal first goes high to the VDD voltage level, the input node 202 is set to 2VDD because of the VDD voltage applied by clock signal Φ1 through the coupling capacitor Ct1. The transistors N2 and P2 refresh respective Vgn and Vgp at nodes 208 and 216 during charge transfer from a previous stage. The intermediate voltage V1 remains at VDD so that the maximum voltage drop across the drain-source of the first NPN transistor N1 is VDD. Similarly, the maximum voltage drop across the first PNP transistor P1 is VDD. After a delay, as indicted in FIG. 4, Φ4 goes to the VDD voltage level so that voltage Vgn at the first NMOS gate node of the first NMOS transistor N1 rises from VDD to 2VDD because of the VDD voltage applied by the clock signal Φ4 through the Cc1 coupling capacitor. The Vgp voltage at the first PMOS gate node 216 goes down to 0 volts because of the low signal provided at the output terminal of the inverter 214. The V2 output voltage at the output node 212 goes to 0 volts because of the Φ2 voltage being at 0 volts. Charge transfer occurs between the 2 capacitors Ct1 and Ct2 through the transistors N1 and P1. The voltage drop across each of the transistors N1 and P1 is limited to VDD. Consequently, low voltage N1, N2, P1, P2 devices are used in the design of this charge pump.

Charge transfer or pumping occurs between transfer capacitors Ct1 and Ct2. The clock signals Φ1 and Φ2 are oppositely phased to activate alternate charge pump stages. The boost clock signals Φ3 and the boost clock signal Φ4 are provided to alternately pump stages of the multi-stage charge pump 300 of FIG. 3 in order to boost the voltages on the gates of the first NMOS transistor N1 and the first PMOS transistor P1 to avoid voltage loss due to the threshold voltages of transistors N1 and P1. This circuit configuration can use pump stages that have low-voltage PMOS and NMOS devices that sustain only VDD voltage drops. The sources and bulks of each respective transistor N1, N2, P1, P2 are coupled together.

For N stages in the multi-stage charge pump 300, the final level of the output signal Vout substantially approaches (N+1) VDD volts. FIG. 5 illustrates the result of a circuit simulation that provides Vout as a function of time for an embodiment of a multi-stage charge pump with 10 stages and a power supply of 1 volt. Good efficiency is obtained with Vout settling to 10.83 volts after initial startup.

FIGS. 6 and 7 illustrate the steady-state input and intermediate voltages as functions of time for one charge pump stage of a multi-stage charge pump. FIG. 6 shows that the input voltage V1 ranges between an approximate 4 volt level of the intermediate voltage V1 and an approximate 3 volt level. FIG. 7 shows that the output voltage V2 operates between the approximate 4 volt level of the intermediate voltage V1 and an approximate 5 volt level. The maximum voltages drops across the transistors N1, N2, P1, P2 is approximately one volt so that high breakdown voltage devices are not required.

The high efficiency multi-stage charge pump of FIG. 3 has charge pump stages that are operable at low VDD voltages of one volt or less using low-voltage NMOS and PMOS devices. The maximum voltage drop across each of the two NMOS transistors and the two PMOS transistors is limited to VDD or the amplitude of the first and second clock signals. Threshold voltages do not limit the gain per stage and low breakdown voltage devices can be used. A maximum voltage drop across the NMOS and PMOS device of each stage is approximately VDD.

The foregoing descriptions of specific embodiments of the present invention has been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A charge pump stage, comprising:
   an NMOS section that includes: a first NMOS transistor coupled between an input node and an intermediate node, a second NMOS transistor coupled between a first NMOS gate of the first NMOS transistor and the input node for refreshing a voltage at the first NMOS gate of the first NMOS transistor, the second NMOS transistor having a second NMOS gate coupled to the intermediate node, a first transfer capacitor coupled between the input node and a first clock input terminal, the first transfer capacitor configured to receive a first clock input signal;
   a first coupling capacitor coupled between the first NMOS gate of the first NMOS transistor and a boost clock signal terminal, the first coupling capacitor configured to receive a boost clock signal;
   a PMOS section that includes: a first PMOS transistor coupled between the intermediate node and an output node; a second PMOS transistor coupled between a first PMOS gate of the first PMOS transistor and the output node for refreshing a voltage at the first PMOS gate of the first PMOS transistor, the second PMOS transistor having a second PMOS gate coupled to the intermediate node, a second transfer capacitor coupled between the output node and a second inverted clock input terminal, the second transfer capacitor configured to receive an inverted first clock signal;
   a second coupling capacitor coupled between the first PMOS gate of the first PMOS transistor and an inverted boost clock signal terminal, the second coupling capacitor configured to receive an inverted boost clock signal; and
   a stabilizing capacitor coupled between the intermediate node and a ground voltage reference.

2. The charge pump stage of claim 1 wherein the boost clock signal is applied to the first coupling capacitor while the first clock signal is active, and wherein the inverted boost clock signal is applied to the second coupling capacitor while the inverted first clock signal is active.

3. The charge pump stage of claim 1 wherein the first clock input signal and the second clock input signals have opposite phases.

4. The charge pump stage of claim 1 wherein the first clock input signal and the second clock input signal operate between the ground voltage and a VDD supply voltage.

5. The charge pump stage of claim 4 wherein the maximum voltage difference across the first NMOS transistor, the second NMOS transistor, the first PMOS transistor, and the second PMOS transistor is a VDD supply voltage.

6. The charge pump stage of claim 1 wherein the coupling capacitors are configured to provide respective boost voltages to the first NMOS transistor and the first PMOS transistor.

7. A charge pump stage, comprising:
an NMOS section that includes: a first NMOS transistor coupled between an input node and an intermediate node, a second NMOS transistor coupled between a first NMOS gate of the first NMOS transistor and the input node for refreshing a voltage at the first NMOS gate of the first NMOS transistor, the second NMOS transistor having a second NMOS gate coupled to the intermediate node, and a first transfer capacitor that is coupled between the input node and a first clock input terminal, the first transfer capacitor being configured to receive a first clock input signal while the first clock input signal is active;
an PMOS section that includes: a first PMOS transistor coupled between the intermediate node and an output node, a second PMOS transistor coupled between a first PMOS gate of the first PMOS transistor and the output node, the second PMOS transistor a second PMOS gate coupled to the intermediate node for refreshing a voltage at the first PMOS gate of the first PMOS transistor;
a second transfer capacitor that is coupled between the output node and a second clock input terminal, the second transfer capacitor being configured to receive a second clock input signal while the second clock signal is active;
a stabilizing capacitor coupled between the intermediate node and a ground voltage reference terminal; and
wherein a maximum voltage difference across the first NMOS transistor, the second NMOS transistor, the first PMOS transistor, and the second PMOS transistor is a VDD supply voltage.

8. The charge pump stage of claim 7 further comprising the stabilizing capacitor coupled between the intermediate node and a ground voltage reference terminal.

9. The charge pump stage of claim 7 wherein the coupling capacitors provide respective boost voltages to the gates of the first NMOS transistor and the first PMOS transistor such that the transistors that have minimal voltage transfer degradation.

10. A multi-stage charge pump, comprising:
a plurality of charge pump stages connected in series, each charge pump stage including:
an NMOS section, including: a first NMOS transistor coupled between an input node and an intermediate node, a second NMOS transistor coupled between a first NMOS gate of the first NMOS transistor and the input node, the second NMOS transistor having a second NMOS gate coupled to the intermediate node;
a first transfer capacitor coupled between the input node and a first clock input terminal, the first transfer capacitor configured to receive a first clock input signal;
a first coupling capacitor coupled between the first NMOS gate of the first NMOS transistor and a boost clock input terminal, the first coupling capacitor configured to receive a boost clock signal;
a PMOS section, including: a first PMOS transistor coupled between the intermediate node and an output node, a second PMOS transistor coupled between a first PMOS gate of the first PMOS transistor and the output node, the second PMOS transistor having a second PMOS gate coupled to the intermediate node;
a stabilizing capacitor coupled between the intermediate node and a ground voltage reference terminal;
a second transfer capacitor coupled between the output node and a second inverted clock input terminal, the second transfer capacitor configured to receive an inverted first clock signal;
a second coupling capacitor coupled between the first PMOS gate of the first PMOS transistor, the second coupling capacitor having an inverted boost clock input terminal configured to receive an inverted boost clock signal;
wherein the first clock input signal and a second clock input signal have opposite phases and operate between a VDD supply voltage and a ground reference voltage; and
wherein a maximum voltage drop across the first NMOS transistor, the second NMOS transistor, the first PMOS transistor, and the second PMOS transistor is VDD.

11. The multi-stage charge pump stage of claim 10 wherein the boost clock signal is applied to the first coupling capacitor while the first clock input signal is active and wherein the inverted boost clock signal is applied to the second coupling capacitor while the second clock input signal is active.

12. The multi-stage charge pump of claim 10 wherein the first clock input signal and the second clock input signals have opposite phases.

13. The multi-stage charge pump of claim 11 including a stabilizing capacitor coupled between the intermediate node and a ground reference terminal.

14. The multi-stage charge pump of claim 11 wherein the coupling capacitors provide respective boost voltages to the first NMOS transistor and the first PMOS transistor such that no voltage degradation occurs due to threshold voltages of the first NMOS transistor and the first PMOS transistor.

* * * * *

UNITED STATES PATENT AND TRADEMARK OFFICE
CERTIFICATE OF CORRECTION

PATENT NO.         : 7,446,596 B1
APPLICATION NO. : 11/753932
DATED                  : November 4, 2008
INVENTOR(S)        : Fort et al.

It is certified that error appears in the above-identified patent and that said Letters Patent is hereby corrected as shown below:

In column 3, line 36, delete "V1." and insert -- Vi. --, therefor.

In column 3, line 37, delete "C1" and insert -- Ci --, therefor.

In column 3, line 65, delete "44" and insert -- Φ4 --, therefor.

In column 4, line 10, delete "C1" and insert -- Ci --, therefor.

In column 5, line 22, delete "V1" and insert -- Vi --, therefor.

In column 5, line 64, delete "V1" and insert -- Vi --, therefor.

In column 5, line 66, delete "V1" and insert -- Vi --, therefor.

Signed and Sealed this

Twenty-fourth Day of February, 2009

JOHN DOLL
*Acting Director of the United States Patent and Trademark Office*